(12) United States Patent
de Mersseman

(10) Patent No.: US 12,332,469 B2
(45) Date of Patent: Jun. 17, 2025

(54) SENSING SYSTEM WITH SIDE ILLUMINATION

(71) Applicant: Magna Electronics, LLC, Southfield, MI (US)

(72) Inventor: Bernard de Mersseman, Andover, MA (US)

(73) Assignee: Magna Electronics, LLC, Southfield, MI (US)

( * ) Notice: Subject to any disclaimer, the term of this patent is extended or adjusted under 35 U.S.C. 154(b) by 416 days.

(21) Appl. No.: 17/573,107

(22) Filed: Jan. 11, 2022

(65) Prior Publication Data

US 2023/0221481 A1 Jul. 13, 2023

(51) Int. Cl.
*F21V 8/00* (2006.01)
*G01S 7/02* (2006.01)
*G01S 7/481* (2006.01)

(52) U.S. Cl.
CPC ............ *G02B 6/0038* (2013.01); *G01S 7/028* (2021.05); *G01S 7/4813* (2013.01); *G02B 6/0056* (2013.01)

(58) Field of Classification Search
CPC ..... G02B 6/0038; G02B 6/0056; G01S 7/028; G01S 7/4813
See application file for complete search history.

(56) References Cited

U.S. PATENT DOCUMENTS

| | | | | |
|---|---|---|---|---|
| 10,938,098 | B2 * | 3/2021 | Mayer Pujadas | ........ H01Q 1/06 |
| 2010/0117885 | A1 * | 5/2010 | Holbrook | ................ G01S 13/89 |
| | | | | 342/22 |
| 2014/0073996 | A1 * | 3/2014 | Jaguan | ................ A61N 5/0618 |
| | | | | 601/15 |
| 2015/0069223 | A1 * | 3/2015 | Yoshimura | ............ B60S 1/0833 |
| | | | | 250/227.14 |
| 2015/0309264 | A1 * | 10/2015 | Abovitz | .................... G02B 6/32 |
| | | | | 385/33 |
| 2018/0045826 | A1 * | 2/2018 | Kasaba | .................... G01S 17/42 |
| 2018/0306401 | A1 * | 10/2018 | Robinson | ................ F21S 41/64 |
| 2019/0232974 | A1 * | 8/2019 | Reiley | .................. G06V 40/161 |
| 2020/0247316 | A1 * | 8/2020 | Peng | ...................... B60K 35/10 |
| 2021/0011162 | A1 * | 1/2021 | Kamerman | ............. G01S 17/95 |
| 2021/0141274 | A1 * | 5/2021 | Wei | .................... G02F 1/133624 |
| 2022/0155409 | A1 * | 5/2022 | Stablo | ...................... B60Q 1/28 |

(Continued)

FOREIGN PATENT DOCUMENTS

| DE | 102016007119 A1 | 2/2017 |
|---|---|---|
| DE | 102018220997 A1 | 6/2020 |

(Continued)

OTHER PUBLICATIONS

International Search Report and Written Opinion of International Application No. PCT/US2022/053161 mailed on Mar. 24, 2023.

*Primary Examiner* — Vladimir Magloire
*Assistant Examiner* — Noah Yi Min Zhu
(74) *Attorney, Agent, or Firm* — Matthew D. Thayne; Thayne and Davis LLC

(57) ABSTRACT

A sensing system includes a sensor with transmitters and detectors. A light source is optically coupled to a light guide disposed in the field of view of the sensor. The light guide is generally planar and the light source illuminates the light guide from an edge, or side, to illuminate the length of the light guide. A housing for the sensing system has a surface configured to reflect or diffract light from the light source towards the surrounding environment.

19 Claims, 10 Drawing Sheets

(56) References Cited

U.S. PATENT DOCUMENTS

| | | | |
|---|---|---|---|
| 2022/0404539 A1* | 12/2022 | Bajec Strle | G02B 6/0035 |
| 2023/0018354 A1* | 1/2023 | Kanechika | G01S 13/931 |
| 2023/0051331 A1* | 2/2023 | Grard | F21S 41/24 |
| 2023/0062751 A1* | 3/2023 | Katsurada | B60Q 1/0023 |
| 2024/0247774 A1* | 7/2024 | Lang | F21S 41/24 |

FOREIGN PATENT DOCUMENTS

| | | |
|---|---|---|
| EP | 3750748 A1 | 12/2020 |
| WO | 2019038107 A1 | 2/2019 |
| WO | 2021/049531 A1 | 3/2021 |

* cited by examiner

SENSING SYSTEM WITH SIDE ILLUMINATION

FIELD OF THE TECHNOLOGY

The subject disclosure relates to object detection and more particularly to detection (or sensing) systems which can be integrated as part of other equipment within a vehicle.

BACKGROUND OF THE TECHNOLOGY

Vehicles often include sensing systems which can be used for collision avoidance, self-driving, cruise control, and the like. Typical sensing systems can rely on the reflections of transmitted signals off objects within the surrounding environment to characterize targets. By analyzing the return signals, information can be gathered about the targets in the environment.

It can be challenging to incorporate a sensing system within the structure and space available in a vehicle. Sensing systems can be unsightly and distracting when added to the exterior of a vehicle. Additionally, sensing systems will not be effective if components of the vehicle interfere with line of sight of the sensing system. Sensing systems must also be adequately secured to the vehicle and protected from the harsh exterior environment around the vehicle. Therefore there is a need to provide a sensing system that is well suited for use within existing vehicles, without adding significant cost.

SUMMARY OF THE TECHNOLOGY

In light of the needs described above, in at least one aspect, the subject technology relates to a sensing system comprising a radar sensor, a light guide, and a light source. The radar sensor includes at least one radar transmit antenna configured transmit a signal and at least one radar receive antenna configured to detect the signal. The light guide is disposed in the field of view of the radar sensor. The light source is optically coupled to the light guide to illuminate the light guide. The light guide extends along a plane and the light source illuminates the light guide from an edge of the plane to illuminate a length of the light guide. The housing for the sensing system includes a surface configured to reflect or diffract light from the light source away from the surface. The light guide is configured to transmit at least a portion of the light from the light source towards the surface of the housing.

In some embodiments, the sensing system includes a cover disposed in the field of view of the radar sensor. The cover is configured to allow the signal to pass therethrough, and the surface of the housing is configured to reflect or diffract at least a portion of the light from the light source through the cover. In some embodiments, the sensing system includes a wire-grid polarizer on an interior surface of the cover, the wire-grid polarizer having a plurality of parallel metallic wires arranged in a plane and aligned perpendicular to an electric field of the radar sensor, wherein the parallel metallic wires are separated by a distance corresponding to an operating frequency of the radar sensor and oriented according to the polarization of the emitting antenna.

In at least one aspect, the subject technology relates to a sensing system having a sensor, a cover, a light guide, a light source, and a housing. The sensor includes at least one transmitter configured to transmit a signal and at least one detector configured to detect the signal. The cover is disposed in a field of view of the sensor and the cover is configured to allow the signal to pass therethrough. The light guide is disposed in the field of view of the sensor. The light source is optically coupled to the light guide to illuminate the light guide. The light guide extends along a plane and the light source illuminates the light guide from an edge of the plane to illuminate a length of the light guide. The housing is for the sensing system and includes a surface disposed offset from the cover and configured to reflect or diffract light from the light source towards the cover. The light guide is configured to transmit at least a portion of the light from the light source towards the surface of the housing.

In some embodiments, the sensor is a radar sensor, the at least one transmitter is a radar transmitter, the at least one detector is a radar detector, and the cover is a radome. In some cases, the system includes a wire-grid polarizer on an interior surface of the cover. The wire-grid polarizer has a plurality of parallel metallic wires arranged in a plane and aligned perpendicular to an electric field of the radar sensor. The parallel metallic wires are separated by a distance corresponding to an operating frequency of the radar sensor and oriented according to the polarization of the emitting antenna.

In some embodiments, the cover includes a resistive contact sensor configured to switch the light source between an on position and an off position in response to contact from a user. The light source can be a light source for an interior overhead light of a vehicle, and the housing can then be shaped to replace the interior overhead light of the vehicle. In some embodiments, the resistive contact sensor includes a film on an exterior of the cover. The film is spaced from the wire-grid polarizer and configured such that applying pressure on the film creates a short circuit between the wire-grid polarizer and the housing causing the resistive contact senor to switch the light source. In some cases, the cover includes a patterned film fixed to a transparent optical polymer. In some cases, the surface of the housing is a reflective metal.

In some embodiments, the sensor is a LiDAR sensor, the at least one transmitter is a LiDAR transmitter configured to transmit infrared and/or near infrared light, the at least one detector is a LiDAR detector, and the housing is configured to allow light from the LiDAR transmitter to pass therethrough while reflecting visible light. In some cases, the surface of the housing includes a near infrared light filter transparent to near infrared light and opaque to visible light, and the light source is configured to emit visible light.

In some embodiments the cover is transparent to visible light. In some embodiments, the light source is configured to emit white light or colored light or Near infrared light. The light can be emitted continuously for illumination purpose or the envelope can be modulated for a combined illumination and sensing purpose (such as indirect time of flight range measurement). In some cases, the light source includes an LED (or laser diode) array facing substantially parallel to a plane of the surface of the housing. In some cases, the cover can be glass or optical polymer. In some embodiments, the surface of the housing includes a reflective film. In some embodiments, the sensing system includes a mask configured to block light from the light source from passing therethrough. The mask includes an opening to allow light from the light source to pass therethrough such that the light passing through the opening exits the sensing system through the cover. In some cases, the light source is positioned to emit light towards the surface of the housing such that the light strikes the surface of the housing at an angle of incidence of less than 25 degrees.

BRIEF DESCRIPTION OF THE DRAWINGS

So that those having ordinary skill in the art to which the disclosed system pertains will more readily understand how to make and use the same, reference may be had to the following drawings.

FIG. 8b is a side view of the cover of FIG. 8a.

FIG. 9b is a side cut-away view of the sensing system of FIG. 9a.

DETAILED DESCRIPTION

Figure 1:
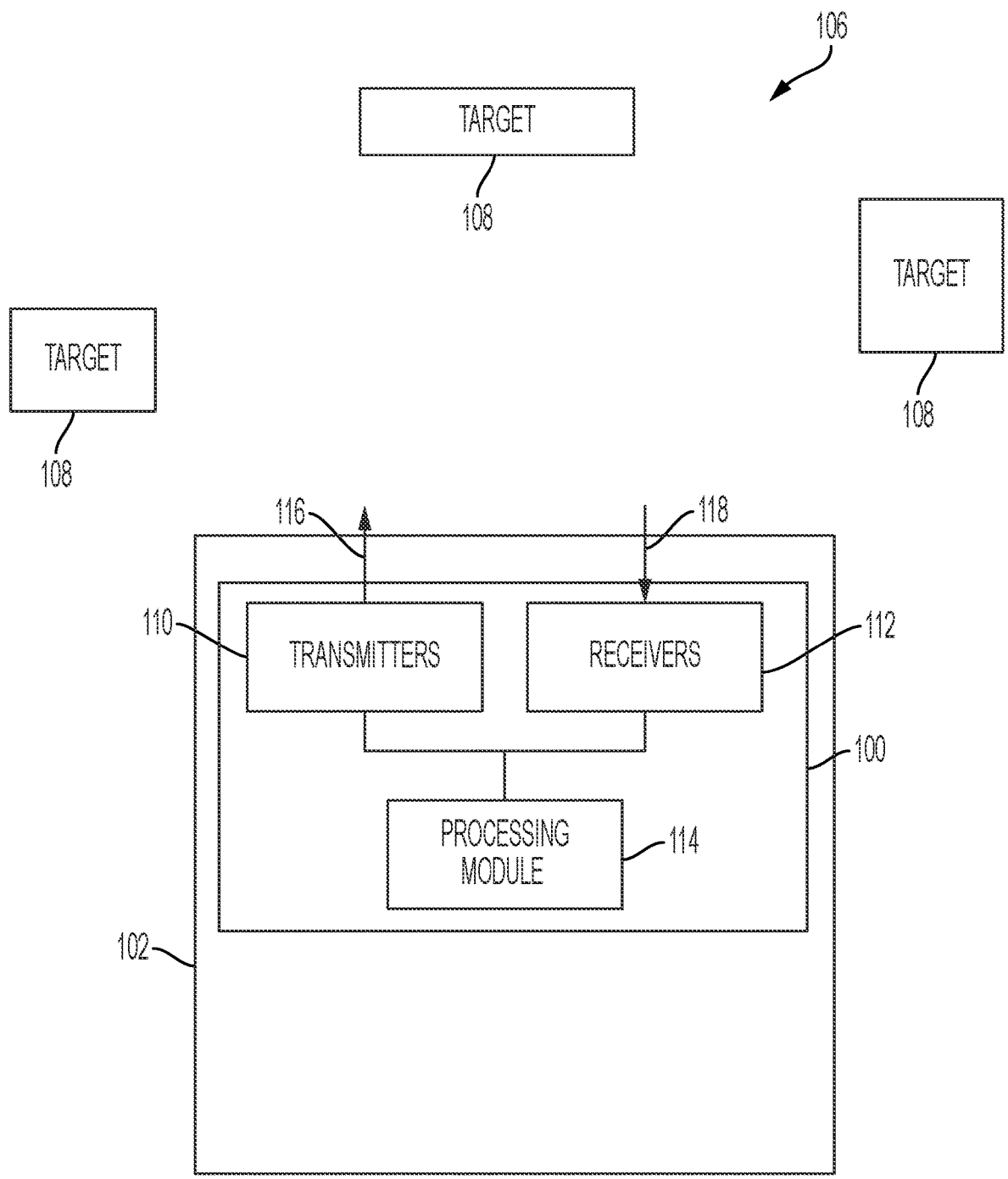
FIG. 1 is a block diagram of a vehicle with a sensing system in accordance with the subject technology.

The subject technology overcomes many of the prior art problems associated with vehicle sensing systems. In brief summary, the subject technology provides a sensing system with an integrated light source (LED/laser) which is designed to replace, or work in conjunction with, existing equipment within a vehicle. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a high elevation).

Referring now to FIG. 1 a block diagram of a vehicle 102 with a simplified sensing system 100 is shown. The vehicle 102 is traveling through an environment 106 which includes a number of targets 108. The vehicle 102 has a sensing system 100 which includes the necessary components for detecting the targets 108 within the environment 106 around the vehicle 102. To that end, the sensing system 100 includes transmitters 110, receivers 112, and a processing module 114. The transmitters 110 are configured to transmit a plurality of signals 116, such as typical radar signals, into the environment 106 across an azimuth range and an elevation range, defining the field of view for the sensing system 100. The signals 116 reflect off targets 108 in the environment 106 and are returned to the vehicle 102, the return signals 118 being received by the receivers 112 (e.g. detectors).

The processing module 114 can include a processor connected to or including memory, and generally, any other necessary components for carrying out the functions of the processing module 114, or the processing functions of the sensing system 100 as a whole, such as individual application specific integrated circuits or multiple separate processors and/or memory banks. The processing module 114 communicates with the transmitters 110 and receivers 112 to facilitate the transmission of the signals 116, and receives and stores data related to the return signals 118 and the detection process generally. The received return signals 118 are processed and relevant detection data is stored in the processing module, such as a magnitude of each return signal 118 and range of the corresponding target 108 as derived from the return signal 118. The sensing system 100 can include other components for transmitting, receiving, processing and storing the signals, and detecting objects generally, as are known in the art.

In one example, the sensing system 100 can be a radar sensor with transmitters 110 being radar transmit antennas and receivers 112 being radar receive antennas. Further, while the components of a radar system are used by way of example, it should be understood that the sensing system 100 may also be a LiDAR sensor system. Accordingly, the transmitters 110 and receivers 112 may be LiDAR transmitters and receivers, respectively. In such a case, the LiDAR sensor can utilize light within the near infrared (NIR) or infrared (IR) light spectrum.

Figure 2:
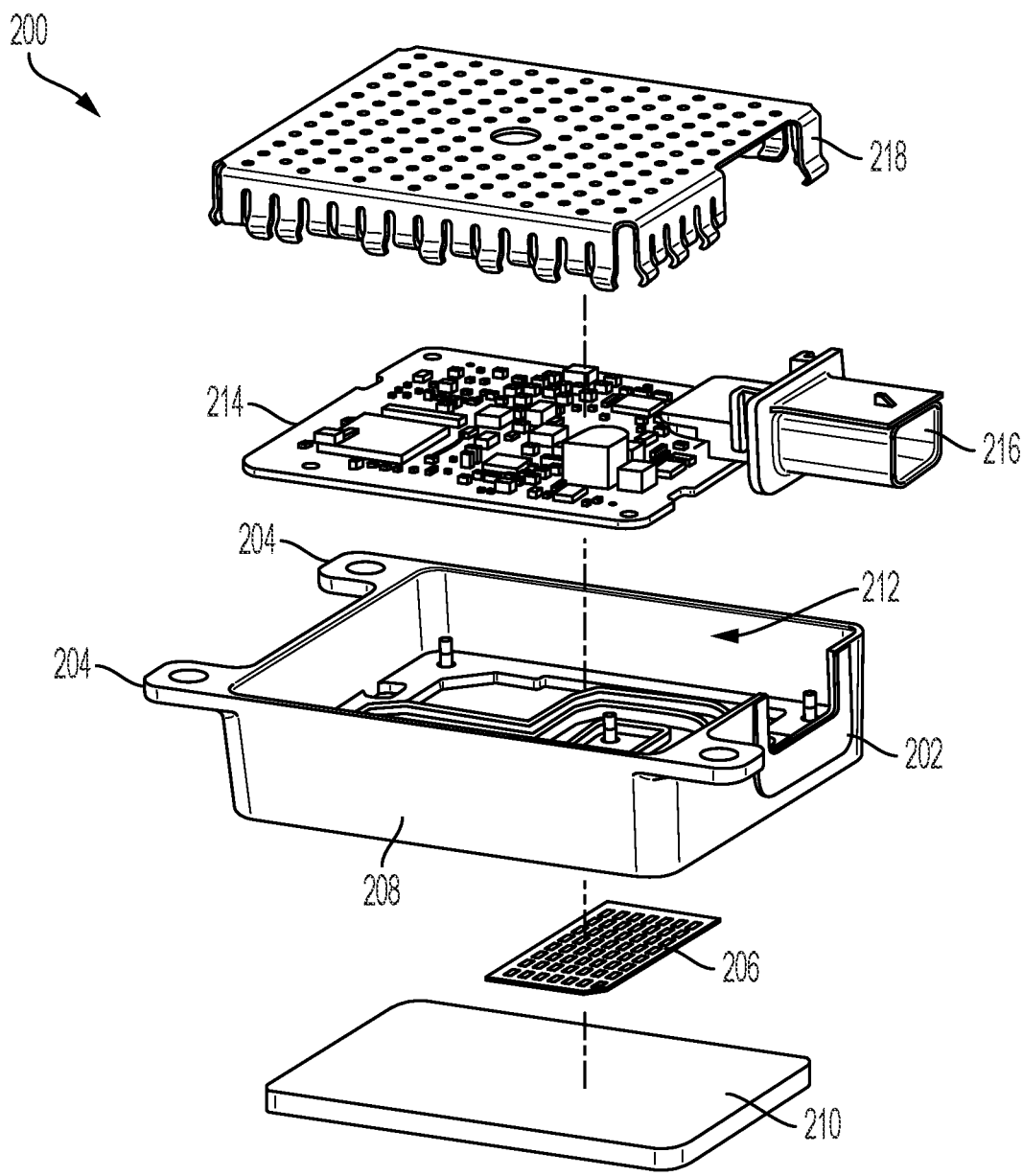
FIG. 2 is an exploded view of a sensing system in accordance with the subject technology.

Referring now to FIG. 2, a sensing system 200 in accordance with the subject technology is shown in exploded form. The system 200 includes a housing 202, which can house components for a radar system, or other type of sensor. The housing 202 includes connector loops 204 which can be used to couple the sensing system 200 to a vehicle, via screws or other fasteners. A radar slot antenna plate 206 which can include an antenna and can be positioned on an exterior face 208 of the housing 202, and a protective cover 210 is located on the exterior side of the antenna. The antenna includes transmit and receive antennas. To that end, the antenna transmits radio frequency (RF) through the cover 210 and into the surrounding environment. Returning signals pass back through the cover 210 and are received by receive antennas of the radar antenna. The cover 210 acts as a protective cover and radome (as it is commonly named) for the sensing system 200. The cover 210 can be a thin, RF transparent protective material, such as a glass or an optical polymer forming an optical waveguide, which helps protect the sensing components from the environment.

On the interior side, the housing 202 forms a cavity 212 within which a PCB 214 can be seated. The PCB 214 can include a processor and memory for carrying out computer instructions. The PCB 214 can be configured to control all functions of the sensing system, including transmission of signals and processing of received return signals. The PCB 214 can also include wireless communication capabilities, allowing for communication with other components of the vehicle. The PCB 214 also includes an electrical connector 216, allowing the PCB 214 to be coupled to a power source. Alternatively, the connector 216 can communicatively connect the PCB 214 to other electronics within the vehicle. An interior cover 218 can be attached to the housing 202 to close the PCB within the housing 202.

Figure 3:
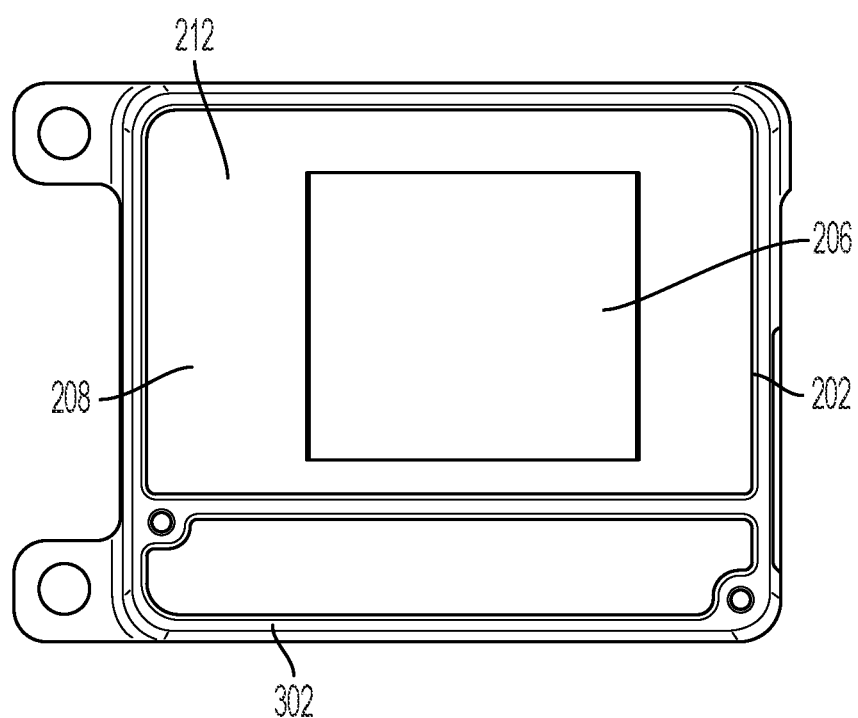
FIG. 3 is an overhead view of a housing for the sensing system of FIG. 2.

Referring now to FIG. 3, an overhead view of the housing 202 (from the exterior) is shown. The radar slot antenna can be fastened directly to the housing 202 adjacent the first cavity of the housing 202. The housing 202 also includes a second cavity 302 within which components for an LED/laser can be seated (on an interior side). The emission optics of the LED can be positioned, as described in more detail below, to emit light on the exterior side of the housing 202, in between the housing and cover 210. In some preferred embodiments, the cover 210 acts as the light guide itself.

Figure 4:
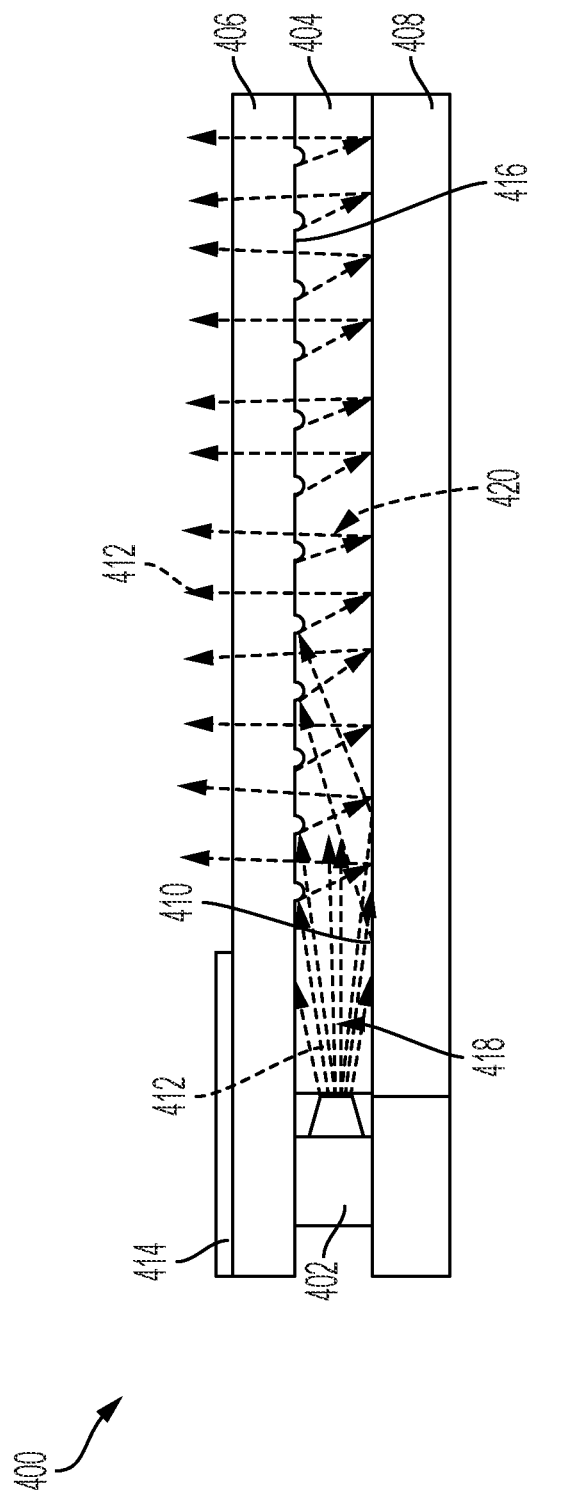
FIG. 4 is a side section view of one embodiment of a sensing system in accordance with the subject technology.

Referring now to FIG. 4, a side section view of components of a sensing assembly 400 in accordance with the subject technology is shown. It should be understood that the sensing assembly 400 can include other system components as shown and described herein. The sensing assembly 400 includes a light source, which can be an LED array 402, coupled to a light guide 404 which runs between a protective, transparent cover 406 and the exterior face of the main structural housing 408 for the sensing system 400. It should be understood that while the array 402 is referred to as an LED array herein for simplicity, the LED array 402 may also be a laser array, or other type of light source, in other embodiments. In particular, the cover 406 and exterior face 410 of the housing form substantially parallel planes, and the light guide 404 extends in a plane parallel to, and between, the cover 406 and housing 408. The LED array 402 is coupled to the side, or edge, of the light guide 404, facing parallel to the plane of the light guide 404 to illuminate the light guide 404 from the side (i.e., as opposed to from a face of the light guide 404). In this way, the light is emitted from the edge of plane of the light guide 404 to illuminate the length of the planar light guide. The LED/laser array 402 can emit various types of light. In some cases, the LED array 402 can emit light within the visible light spectrum, such as white light, and can be used to replace a typical light display on the vehicle. In other cases, the LED can be outside the visible light spectrum, such as infrared. In some cases, the light can be continuous for illumination and, in other cases, the light can be modulated for sensing.

Light 412 emitted from the LED array 402 can fan outwards from the LED array 402 and pass through the light guide 404, and eventually the cover 406, to be emitted into the surrounding environment. The interior side 416 of the cover can also include a micro-lens array or a nanoimprint pattern to disperse light 412 passing into the environment as desired. The exterior face 410 of the housing 408 is designed to reflect and diffuse light 412 from the LED array 402. For example, the exterior face 410 of the housing 408 can be a reflective metallic surface, or a diffusing surface. To pass through the light guide 404 and in the direction of the cover 406, the light 412 must strike the exterior face 410 at a very low angle (e.g. less than 25 degrees) to have the proper angle of incidence (although note that the cover 406 itself is not necessary in all embodiments). In some cases, this configuration can work to illuminate the light guide 404 itself, blocking a view of the interior components (such as the antenna) when view from an exterior of the sensing system 400. This can be helpful in allowing the sensing system 400 to be included as part of a vehicle without impacting aesthetics, as the illuminated light guide 404 will block other aesthetically unappealing components of the sensing system 400. Further, since the system 400 can also emit light through the protective cover 406, the system 400 can replace a conventional light on a vehicle, while also including the sensing capabilities discussed herein. Various types of light guides can be used to modify the light emitted from the system 400 as desired. For example, in some cases, the light guide 404 can include be a 0.1 mm polyester film with pressure sensitive adhesive. The film can be embossed and metalized to be bring out a color tint and/or to provide a particular pattern of emitted light. Such a film is commonly manufactured with nanoimprint lithography, which is low cost and compatible with high volume.

A perimeter mask 414 can also be included to control light passing through the protective cover 406, blocking unwanted light from passing into the surrounding environment and also limiting light from the environment passing into the sensing system 400. In the exemplary perimeter mask 414, the mask 414 runs adjacent to an initial mixing region 418 within the light guide 404 closest to the LED array 402. After passing through the mixing region 418, light 412 passes into an emitting region 420 where some light 412 reflects off the exterior face 410 at a low angle of incidence and is reflected through the cover 406 and into the environment. This can be useful to ensure the shape of light passing through the cover resembles other lights typically found on a vehicle. In some cases, the exterior face 410 of the housing 408 can also include a colored diffusing surface (e.g. a white diffusing surface) which can be perceived through a transparent cover 406.

Figure 5:
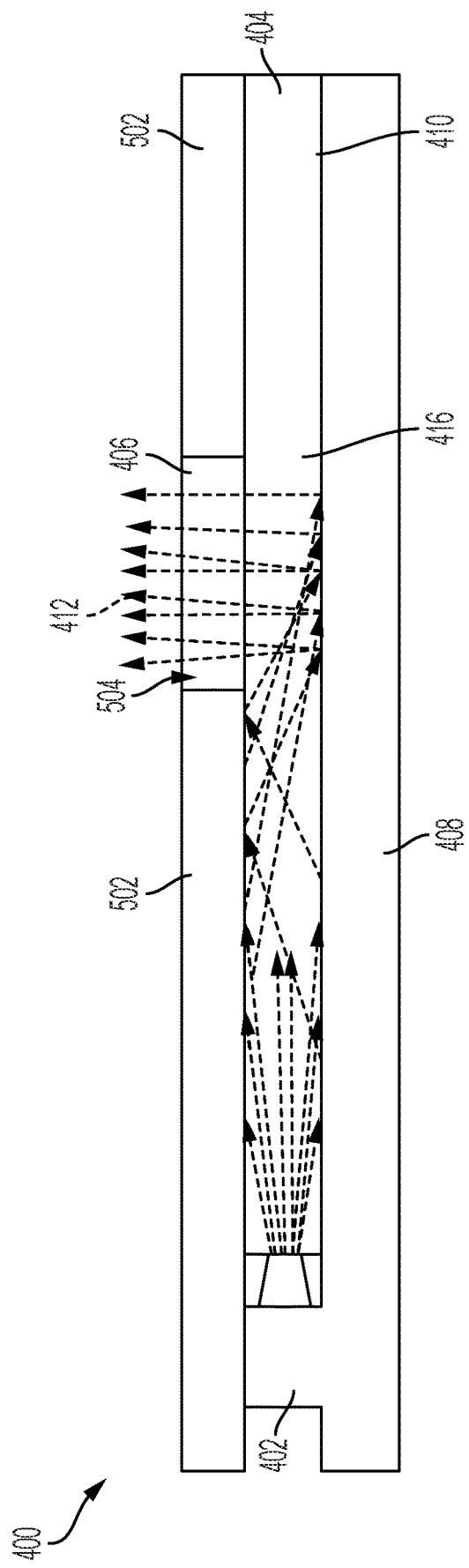
FIG. 5 is a side section view of one embodiment of a sensing system in accordance with the subject technology.

Another example showing the utilization of a perimeter mask 502 can be seen in FIG. 5. In some cases, the mask 414, 502, or other decorative or patterned film on the cover 306, can shape the light to a desired pattern, for aesthetics purposes or for external communication or illumination efficacy. In the example shown in FIG. 5, the mask 502 is provided, on the cover 406, on either side of a central opening 504. Light 412 that reflects off the exterior surface 410 of the housing 408 at a low angle of incidence passes through the central opening 504 in the mask 502 and into the surrounding environment.

In one example, the system 400 can replace a traditional light within the vehicle, such as an overhead light, to convert the light to a functional radar system with a light source. As such, the system 400 can be designed such that the mask 414, 502, cover 406, and housing 408 have a similar appearance to typical lights found on vehicles, allowing the sensing system 400 to be integrated as part of the vehicle without appearing unsightly. For example, the system 400 can be integrated as part of a typical overhead interior vehicle light on the ceiling of the vehicle. In another example, the system 400 can be integrated as part of a small light on a side mirror of the vehicle. In yet another example, the system 400 can be integrated as part of a headlight, or rear vehicle light. As discussed above, the illumination of the light guide 404 and/or cover 406 by the LED array 402 helps mask the interior components, while the rest of the system 400 is designed to still function effectively as a radar sensing system with a protective radome.

Figure 6:
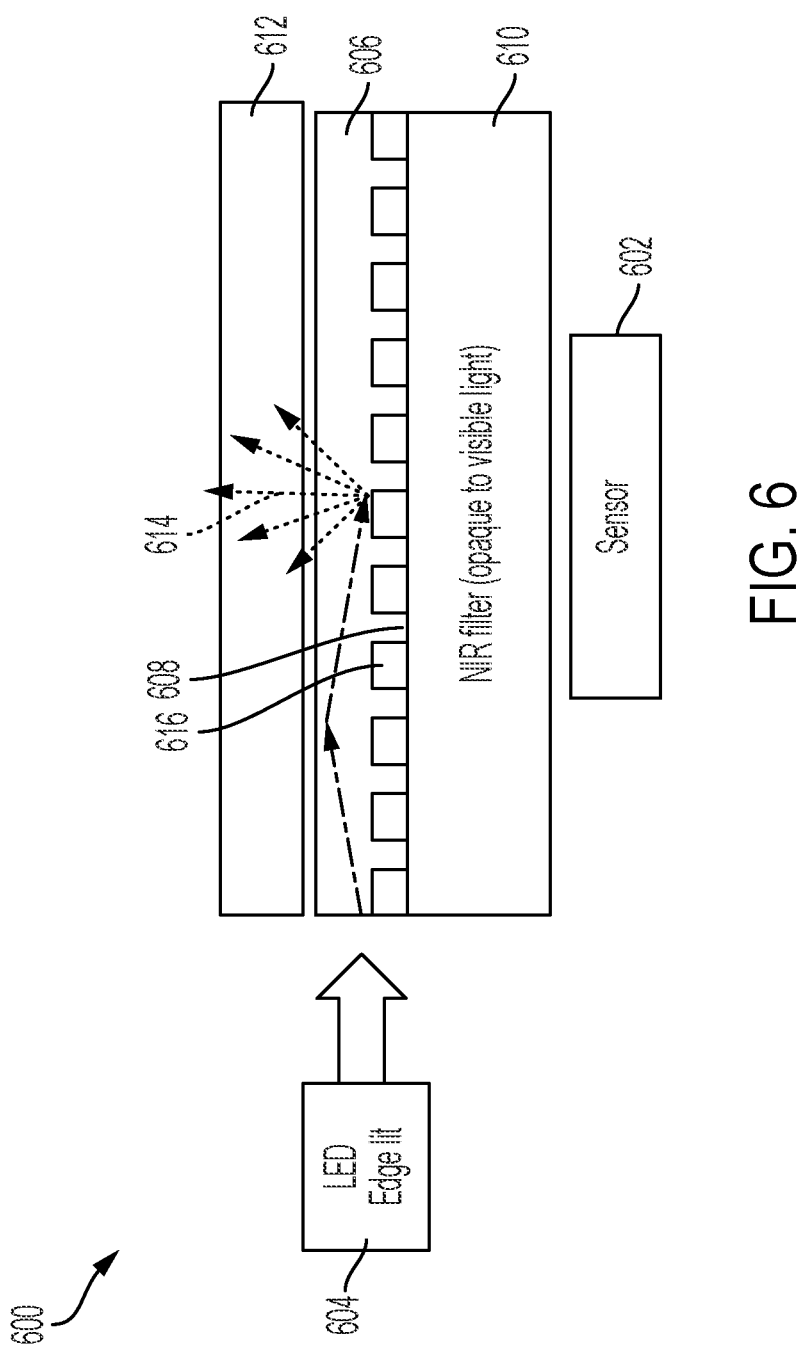
FIG. 6 is a side section view of one embodiment of a sensing system in accordance with the subject technology.
Figure 7:
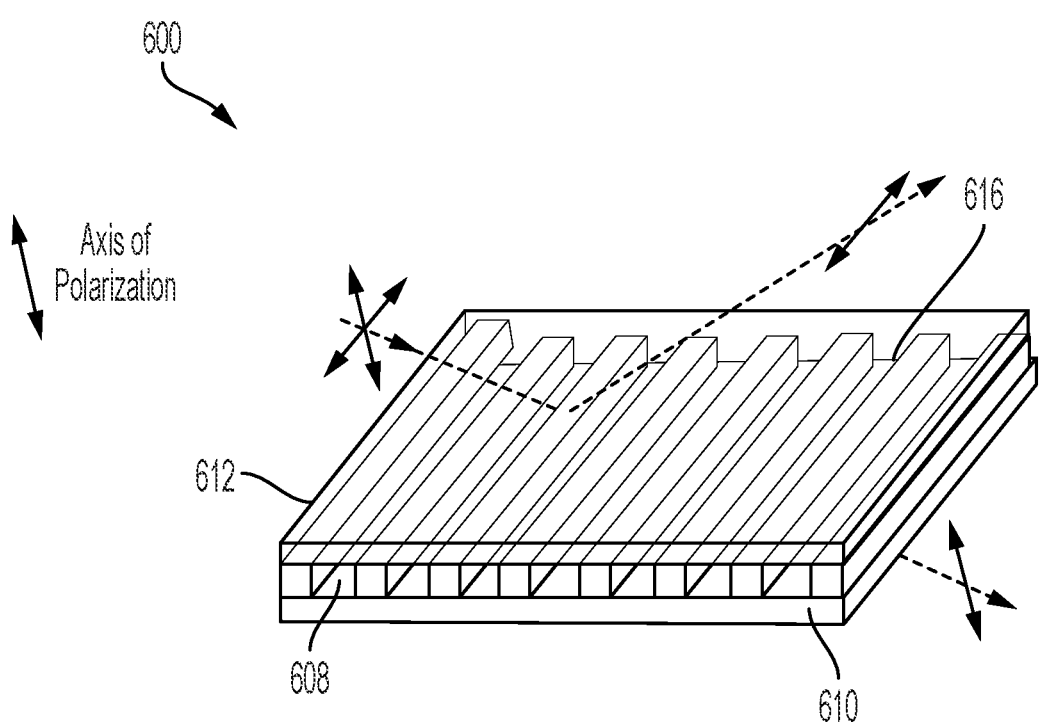
FIG. 7 is a perspective view of the sensing system of FIG. 6.

While a radar sensing system is referenced above by way of example, it should also be understood that the sensing system described herein could also be another type of known sensor, such as a LiDAR sensor. Referring now to FIGS. 6-7, an exemplary LiDAR sensing system 600 is shown. The sensing system 600 can be the same as other sensing systems described herein, except as otherwise shown and described.

The LiDAR sensing system 600 includes a LiDAR sensor 602, which can include LiDAR transmitters and LiDAR receivers. As with other systems described herein, the sensing system 600 can include an LED array 604 (or other light source) coupled to a light guide 606 such that the LED array 604 illuminates the light guide 606 from the side. The light guide 606 is positioned between a cover 612 and an exterior surface 608 of a portion of the radar housing 610 (note 610 represents only a portion of the overall housing that may be used). In this example, the portion of the housing 610 shown can be a near infrared (NIR) filter that is opaque to visible light, but allows NIR light to pass through. In that regard, the surface 608 can reflect and/or diffuse visible light 614 emitted from the LED array 604, causing the light 614 to pass through the cover 612 and into the surrounding environment. Therefore the LiDAR sensor 602 can utilize NIR light. The housing 610 can then be positioned in the field of view of the sensor 602, and the NIR light 614 from the sensor 602 will still pass through the housing 610 and into the environment.

The housing surface 608 can also include a plurality of metallic wire grids 616 (or nanopatterns) running along the plane of the surface 608 and light guide 606. The metallic wire grid 616 are spaced apart and parallel to one another. Exiting light from the laser source employed in LiDAR sensors is polarized. Some polarizing filters have visible light diffusing properties at very high angle of incidence, such as nano wires network or nano imprint patterns. Therefore, in one example, the cover 612 can be a clear substrate of glass or optical polymer (e.g. plastic polymer), illuminated from the side by the LED array 604. A polarization film can be applied on the exterior surface 608 of the housing 610 to diffuse light from the LED array 604 outwardly, towards the cover 612. This has the added benefit that, when the LED array 604 is turned off, the sensing system 600 appears opaque from the outside due to the NIR filter. As such, the sensing system 600 remains transparent to NIR light, allowing full sensing capabilities, while appearing opaque to outside viewers and blocking visible light from interfering with the sensor 602. This sensing system 600 is particularly suited for replacement of existing lights on a vehicle, such as interior overhead lights or on the underside of a side view mirror. In some cases, the sensor 602 can also include an imaging camera sensor collocated with the LiDAR sensor, which can benefit from the illumination from headlights, interior lights, or the like.

Figure 8B:
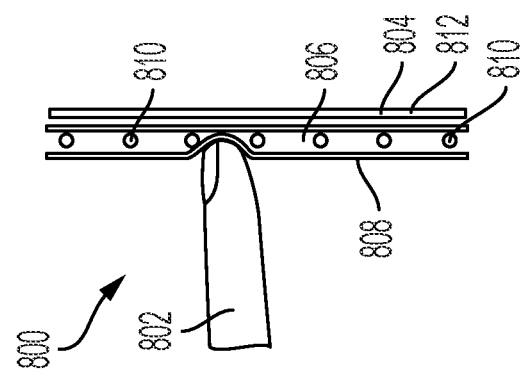
Figure 8A:
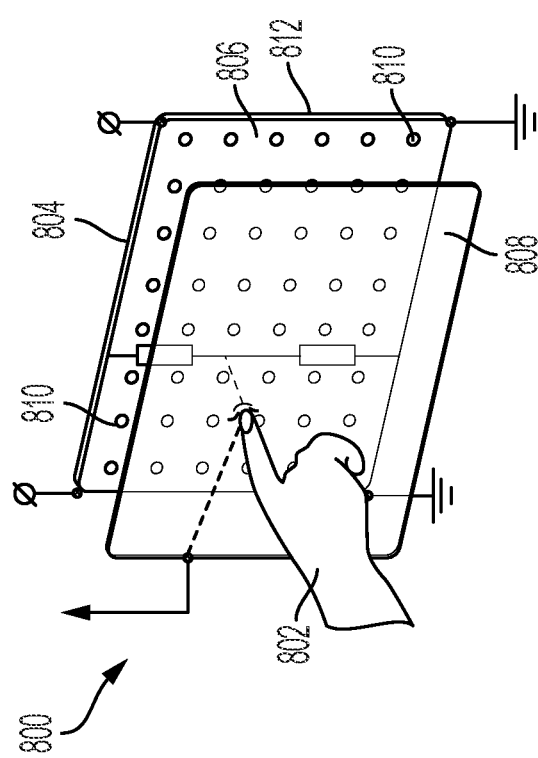
FIG. 8a is a perspective view of a cover for a sensing system in accordance with the subject technology.

Referring now to FIGS. 8a-8b, another embodiment of a cover design is shown, which can be used as part of the sensing systems described herein. The cover 800 is well suited for use as part of an interior light of a vehicle. Generally, the cover 800 converts the cover of the radar or LiDAR sensor into a resistive contact sensor which can be to turn the LED array of the sensing system on and off in response to a touch from the user 802. This allows for easily controlling the interior light of the vehicle. It also avoids the need for a mechanical switch, saving space and cost. Therefore, in this embodiment, the cover 800 becomes a contact switch for a light source within the vehicle.

The cover 800 includes a protective glass panel 804 with a transparent electrode film 806 on the exterior of the panel 804. A second film 808 is positioned on the exterior of the transparent electrode film 806. Spacer dots 810 are placed periodically between the films 806, 808, to maintain a separation between the films 806, 808. However, when force (e.g. from a press from a user's 802 finger) is applied to the outer film 808, the outer film 808 will contact the transparent electrode film 806 and create a short circuit. In some cases, the short circuit can be complete by including an electrical connection between the transparent electrode film 806 and the housing of the sensing system. As mentioned above, in the example of a radar sensing system, the housing can be a metallic frame. The metallic frame can be grounded, and therefore the completion of the circuit between the films 808, 806 can provide a short to ground. Note, while two films 806, 808 are shown by way of example, the switch may function by otherwise creating a short to ground, such by providing an electrical contact that forms an electrical connection between the film 808 and housing in response to pressure on the film.

Further, in the example of a radar sensing system, the electric field emitted from the radar antenna will be linearly polarized. Therefore a wire-grid polarizer can be incorporated on the interior surface 812 of the cover 800. In general, the wire-grid polarizer can include a number of parallel metallic wires arranged in a plane. The electric field from the radar transmitter will then be aligned perpendicular to the plane of the wires, resulting in an incident wave that can pass through the grid with little reflected energy. The electric field parallel to the grid is absorbed, or dissipated. The wire-grid polarizer can be tailored to the operating frequency of the radar antenna (e.g. 60 Ghz, 77 Ghz, or another frequency). In particular, the separation between the wires can be modified to correspond to the operating frequency of the radar sensor.

Figure 9A:
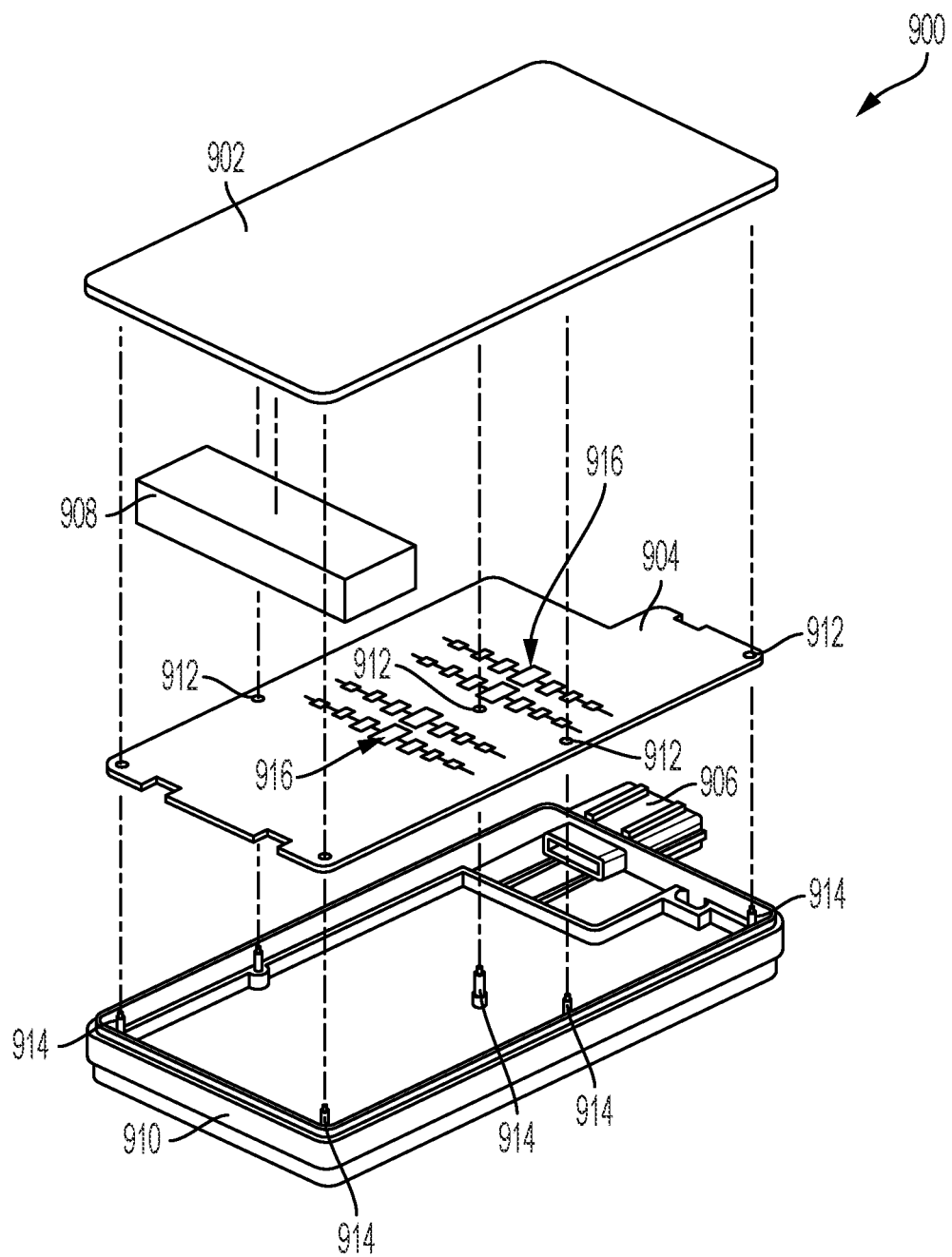
FIG. 9a is an exploded view of a sensing system in accordance with the subject technology.
Figure 9B:
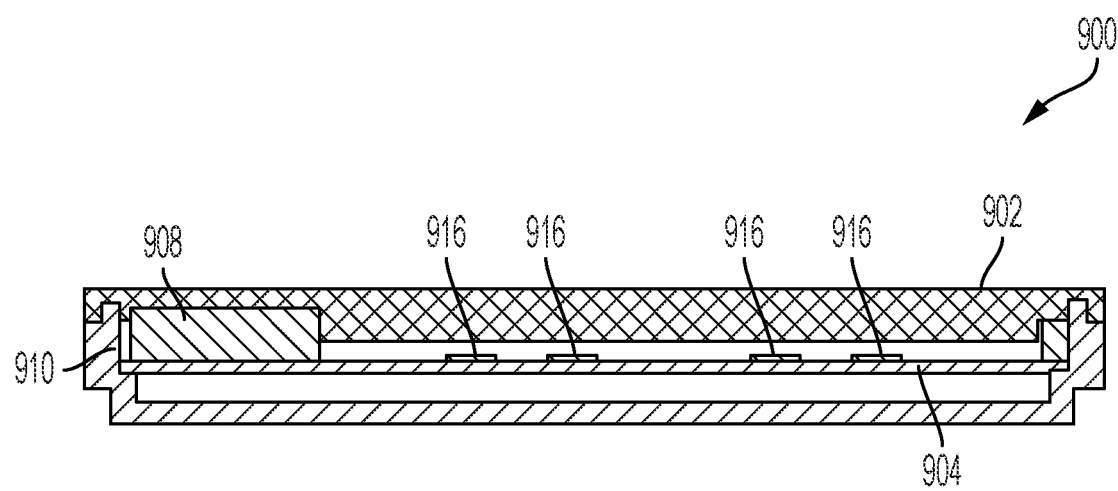

Referring now to FIGS. 9a-9b, an embodiment of another sensing system 900, in accordance with the subject technology, is shown. The sensing system 900 can be configured similarly to the sensing system 200, except as otherwise shown and described. In general, the system 900 similarly includes a radar sensor and is configured for use in a vehicle. The sensing system 900 includes a PCB 904 which acts as the radar sensor affixed within a housing 910. The housing 910 includes connectors 914 which run through holes 912 of the PCB 904 to maintain the PCB 904 in place. A cover 902 can attached to the top of the housing 910, coupling with the connectors 914 to seal the PCB 904 within the housing 910.

A surface of the PCB 904 includes patch antennas 916 which can include transmit and receive antennas. It should be understood that this represents just another type of antenna for a radar sensor, and the teachings herein could be utilized in radar systems with a variety of antenna configurations. The antennas 916 are positioned with the cover 902 in the field of view, such that transmitted and received signals pass therethrough. The cover 902 acts as a radome for the system 900, and can be formed from thin, RF transparent protective material such as glass or an optical polymer. The PCB 904 can include a processor and memory for carrying out computer instructions, and be configured to control all functions of the sensing system 900 including operation of the antennas 916, transmission of signals, and processing of received return signals. The PCB 904 can also include wireless communication capabilities, allowing for communication with other components of the vehicle. An electrical connector 906 allows the PCB 904 to be coupled to a power source, or alternatively, can allow the PCB 904 to connect to other electronics within the vehicle.

As with other systems discussed herein, the sensing system 900 includes a light source 908, which can include an array of LEDs or the like. The light source can be coupled to a light guide somewhere in the field of view of the antennas 916. In some cases the light source 908 can be coupled to an edge of the cover 902, with the cover 902 acting as the light guide. The light guide acts as an optical waveguide for the light from the light source 908. Generally, the light guide will extend along a plane (e.g. parallel to the PCB 904), and will be illuminated from an edge of the plane by the light guide. Some of the light passing through the light guide will pass at an oblique angle with respect to the PCB 904 and/or a lower surface of the housing 910. The housing 910 can also include a surface to reflect or diffract light from the light source, causing some of the light from the light source 908 to pass through the cover 902 and out of the sensing system 900. Further, in some cases, the cover 902 can itself be designed to be illuminated by the light.

As such, as described herein, the sensing systems disclosed provide an effective sensing system using LiDAR and/or radar sensors. The sensing system can be incorporated into an existing vehicle, replacing typical hardware such as an interior light or headlight without requiring additional available space or adding any unsightly new components. In particular, the sensing system incorporates a light source to replace a light source of the vehicle and the sensing components of the system will be masked through side illumination of the light guide and/or cover.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A sensing system comprising:
a radar sensor including: at least one radar transmit antenna configured transmit a signal; and at least one radar receive antenna configured to detect the signal;
a light guide disposed in the field of view of the radar sensor;
a light source optically coupled to the light guide to illuminate the light guide, wherein an entire length of the light guide extends along a plane and the light source illuminates the light guide from an edge of the plane to illuminate a length of the light guide;
a housing for the sensing system including a surface configured to reflect or diffract light from the light source away from the surface, wherein the light guide is configured to transmit at least a portion of the light from the light source towards the surface; and
a wire-grid polarizer on an interior surface of a cover, the wire-grid polarizer having a plurality of parallel metallic wires arranged in a plane and aligned perpendicular to an electric field of the radar sensor, wherein the parallel metallic wires are separated by a distance corresponding to an operating frequency of the radar sensor, and wherein the wire-grid polarizer is positioned adjacent to and extends into the light guide such that the wire-grid polarizer is configured to reflect or diffract light from the light guide.

2. The sensing system of claim 1, wherein the cover is disposed in a field of view of the radar sensor, wherein:
the cover is configured to allow the signal to pass therethrough; and
the surface of the housing is configured to reflect or diffract at least a portion of the light from the light source through the cover.

3. A sensing system comprising:
a sensor including: at least one transmitter configured to transmit a signal; and at least one detector configured to detect the signal;
a cover disposed in a field of view of the sensor, wherein the cover is configured to allow the signal to pass therethrough;
a light guide disposed in the field of view of the sensor;
a light source optically coupled to the light guide to illuminate the light guide, wherein an entire length of the light guide extends along a plane and the light source illuminates the light guide from an edge of the plane to illuminate a length of the light guide;
a housing for the sensing system including a surface disposed offset from the cover and configured to reflect or diffract light from the light source towards the cover, wherein the light guide is configured to transmit at least a portion of the light from the light source towards the surface such that the at least a portion of the light contacts the surface of the housing from within the light guide to reflect or diffract the at least a portion of the light towards the cover; and
a wire-grid polarizer on an interior surface of the cover, the wire-grid polarizer having a plurality of parallel metallic wires arranged in a plane and aligned perpendicular to an electric field of the sensor, wherein the parallel metallic wires are separated by a distance corresponding to an operating frequency of the sensor, and wherein the wire-grid polarizer is positioned adjacent to and extends into the light guide such that the wire-grid polarizer is configured to reflect or diffract light from the light guide.

4. The sensing system of claim 3, wherein:
the sensor is a radar sensor;
the at least one transmitter is a radar transmitter;
the at least one detector is a radar detector; and
the cover is a radome.

5. The sensing system of claim 4, wherein the parallel metallic wires are oriented according to a polarization of the radar transmitter.

6. The sensing system of claim 5, wherein the cover includes a resistive contact sensor configured to switch the light source between an on position and an off position in response to contact from a user.

7. The sensing system of claim 6, wherein the resistive contact sensor comprises:
a film on an exterior of the cover, the film spaced from the wire-grid polarizer and configured such that applying pressure on the film creates a short circuit between the wire-grid polarizer and the housing causing the resistive contact senor to switch the light source between an on position and an off position.

8. The sensing system of claim 5, wherein the light source is a light source for an interior overhead light of a vehicle, and the housing is shaped to replace the interior overhead light of the vehicle.

9. The sensing system of claim 3, wherein the cover comprises a patterned film fixed to a transparent optical polymer.

10. The sensing system of claim 3, wherein the surface of the housing is a reflective metal.

11. The sensing system of claim 3, wherein:
the sensor is a LIDAR sensor;
the at least one transmitter is a LIDAR transmitter configured to transmit one or more of the following types of light: infrared; near infrared;
the at least one detector is a LiDAR detector; and the housing is configured to allow light from the LiDAR transmitter to pass therethrough while reflecting visible light.

12. The sensing system of claim 11, wherein:
the surface of the housing includes a near infrared light filter transparent to near infrared light and opaque to visible light; and
the light source is configured to emit visible light.

13. The sensing system of claim 3, wherein the cover is transparent to visible light.

14. The sensing system of claim 3, wherein the light source is configured to emit white light.

15. The sensing system of claim 3, wherein the light source includes an LED array facing substantially parallel to a plane of the surface of the housing.

16. The sensing system of claim 3, wherein the cover is one of the following: glass; optical polymer.

17. The sensing system of claim 3, wherein the surface of the housing includes a reflective film.

18. The sensing system of claim 3, further comprising a mask configured to block light from the light source from passing therethrough, the mask including an opening to allow light from the light source to pass therethrough such that the light passing through the opening exits the sensing system through the cover.

19. The sensing system of claim 3, wherein the light source is positioned to emit light towards the surface of the housing such that the light strikes the surface of the housing at an angle of incidence of less than 25 degrees.

\* \* \* \* \*